(12) United States Patent
Shenkman et al.

(10) Patent No.: US 6,389,007 B1
(45) Date of Patent: *May 14, 2002

(54) METHOD AND APPARATUS FOR PROVIDING INTEGRATED ROUTING FOR PSTN AND IPNT CALLS IN A CALL CENTER

(75) Inventors: Grigory Shenkman, South San Francisco; Alec Miloslavsky, Hillsborough, both of CA (US)

(73) Assignee: Genesys Telecommunications Laboratories, Inc., San Francisco, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/160,558

(22) Filed: Sep. 24, 1998

(51) Int. Cl.⁷ ............................................... H04L 12/66
(52) U.S. Cl. ................................. 370/352; 379/265.11
(58) Field of Search ............................... 370/352–356, 370/401, 410, 522; 379/265, 266, 267, 265.01, 265.02, 265.03, 265.04, 265.05, 265.08, 265.09, 265.1, 265.11, 266.06

(56) References Cited

U.S. PATENT DOCUMENTS

| 5,392,345 A | * | 2/1995 | Otto ........................... 379/265 |
|---|---|---|---|
| 5,546,452 A | * | 8/1996 | Andrews et al. ............ 379/219 |
| 5,619,557 A | * | 4/1997 | Berkum ........................ 379/88 |
| 5,742,675 A | * | 4/1998 | Kilander et al. ............ 379/265 |
| 5,778,060 A | * | 7/1998 | Otto ........................... 379/265 |
| 5,802,526 A | * | 9/1998 | Fawcett et al. ............. 707/104 |
| 5,848,143 A | * | 12/1998 | Andrews et al. ............ 379/219 |
| 5,884,032 A | * | 3/1999 | Bateman et al. ............ 709/204 |
| 5,903,877 A | * | 5/1999 | Berkowitz et al. ........... 705/26 |
| 5,926,539 A | * | 7/1999 | Shtivelman .................. 379/266 |
| 5,933,492 A | * | 8/1999 | Turovski ..................... 379/265 |
| 5,970,126 A | * | 10/1999 | Bowater et al. ............. 379/114 |
| 5,974,135 A | * | 10/1999 | Breneman et al. .......... 379/265 |
| 5,991,394 A | * | 11/1999 | Dezonno et al. ............ 379/265 |
| 6,044,146 A | * | 3/2000 | Gisby et al. ................. 379/265 |
| 6,055,308 A | * | 4/2000 | Miloslavsky et al. ....... 379/265 |
| 6,130,933 A | * | 10/2000 | Miloslavsky ............. 379/90.01 |
| 6,134,318 A | * | 10/2000 | O'Neil ........................ 379/266 |
| 6,137,862 A | * | 10/2000 | Atkinson et al. ............. 379/34 |
| 6,192,050 B1 | * | 2/2001 | Stovall ........................ 370/389 |
| 6,201,804 B1 | * | 3/2001 | Kikinis ........................ 370/352 |
| 6,230,197 B1 | * | 5/2001 | Beck et al. .................. 709/223 |
| 6,230,287 B1 | * | 5/2001 | Pinard et al. ................. 714/31 |

* cited by examiner

*Primary Examiner*—Chau Nguyen
*Assistant Examiner*—Jasper Kwoh
(74) *Attorney, Agent, or Firm*—Donald R. Boys; Central Coast Patent Agency, Inc.

(57) ABSTRACT

An integrated router (IR) in a call center monitors and controls both a telephony switch receiving and forwarding connection-oriented, switched telephony (COST) calls and a Data Network Telephony (DNT) processor receiving and forwarding DNT calls. The one IR consults a common data repository storing status of agents on both types of calls, and routes all calls according to a single set of rules, which can take a variety of forms. In one embodiment telephones at agent stations are adapted to handle both OST and DNT calls.

8 Claims, 3 Drawing Sheets

METHOD AND APPARATUS FOR PROVIDING INTEGRATED ROUTING FOR PSTN AND IPNT CALLS IN A CALL CENTER

FIELD OF THE INVENTION

The present invention is in the field of telephony communication and pertains more particularly to methods and apparatus for seamless integration in routing of network-based connection-orientated, switched telephony (COST) and Data Network Telephony (DNT) calls, such as Internet-Protocol-Network-Telephony (IPNT) calls, within a call center.

BACKGROUND OF THE INVENTION

In the field of telephony communication, there have been many improvements in technology over the years that have contributed to more efficient use of telephone communication within hosted call-center environments. Most of these improvements involve integrating the telephones and switching systems in such call centers with computer hardware and software adapted for, among other things, better routing of telephone calls, faster delivery of telephone calls and associated information, and improved service with regards to client satisfaction. Such computer-enhanced telephony is known in the art as computer-telephony integration (CTI).

Generally speaking, CTI implementations of various design and purpose are accomplished both within individual call-centers and, in some cases, at the network level. For example, processors running CTI software applications may be linked to telephone switches, service control points and network entry points within a public or private telephone network. At the call-center level, CTI-enhanced processors, data servers, transaction servers, and the like, are linked to telephone switches and, in some cases, to similar CTI hardware at the network level, often by a dedicated digital link. CTI and other hardware within a call-center is commonly referred to as customer premises equipment (CPE). It is the CTI processor and application software at such centers that provides computer enhancement to a call center.

In a CTI-enhanced call center, telephones at agent stations are connected to a central telephony switching apparatus, such as an automatic call distributor (ACD) switch or a private branch exchange (PBX). The agent stations may also be equipped with computer terminals such as personal computer/video display unit's (PC/VDU's) so that agents manning such stations may have access to stored data as well as being linked to incoming callers by telephone equipment. Such stations may be interconnected through the PC/VDUs by a local area network (LAN). One or more data or transaction servers may also be connected to the LAN that interconnects agent stations. The LAN is, in turn, connected to the CTI processor, which is connected to the call switching apparatus of the call center.

When a call arrives at a call center, whether or not the call has been pre-processed at an SCP, typically at least the telephone number of the calling line is made available to the receiving switch at the call center by the network provider. This service is available by most networks as caller-ID information in one of several formats such as Automatic Number Identification Service (ANIS). If the call center is computer-enhanced (CTI) the phone number of the calling party may be used to access additional information from a customer information system (CIS) database at a server on the network that connects the agent workstations. In this manner information pertinent to a call may be provided to an agent, often as a screen pop.

In recent years, advances in computer technology, telephony equipment, and infrastructure have provided many opportunities for improving telephone service in publicly-switched and private telephone intelligent networks. Similarly, development of a separate information and data network known as the Internet, together with advances in computer hardware and software have led to a new multi-media telephone system known in the art by several names. In this new systemology, telephone calls are simulated by multi-media computer equipment, and data, such as audio data, is transmitted over data networks as data packets. In this application the broad term used to describe such computer simulated telephony is Data Network Telephony (DNT).

For purposes of nomenclature and definition, the inventors wish to distinguish clearly between what might be called conventional telephony, which is the telephone service enjoyed by nearly all citizens through local telephone companies and several long-distance telephone network providers, and what has been described herein as computer-simulated telephony or data-network telephony (DNT). The conventional system is familiar to nearly all, and is often referred to in the art as connection-oriented-switched-telephony (COST). The COST designation will be used extensively herein. The computer-simulated, or DNT systems are familiar to those who use and understand computer systems. Perhaps the best example of DNT is telephone service provided over the Internet, which will be referred to herein as Internet-Protocol-Network-Telephony (IPNT), by far the most extensive, but still a subset of DNT.

Both systems use signals transmitted over network links. In fact, connection to data networks for DNT such as IPNT is typically accomplished over local telephone lines, used to reach such as an Internet Service Provider (ISP). The definitive difference is that COST telephony may be considered to be connection-oriented telephony. In the COST system, calls are placed and connected by a specific dedicated path, and the connection path is maintained over the time of the call. Bandwidth is thus assured. Other calls and data do not share a connected channel path in a COST system. In a DNT system, on the other hand, the system is not dedicated or connection oriented. That is, data, including audio data, is prepared, sent, and received as data packets. The data packets share network links, and may travel by variable paths, being reassembled into serial order after receipt. Therefore, bandwidth is not guaranteed.

Under ideal operating circumstances a DNT network, such as the Internet, has all of the audio quality of conventional public and private intelligent telephone-networks, and many advantages accruing from the aspect of direct computer-to-computer linking. However, DNT applications must share the bandwidth available on the network in which they are traveling., As a result, real-time voice communication may at times suffer dropout and delay. This is at least partially due to packet loss experienced during periods of less-than-needed bandwidth which may prevail under certain conditions such as congestion during peak periods of use, and so on.

Recent improvements to available technologies associated with the transmission and reception of data packets during real-time DNT communication have enabled companies to successfully add DNT, principally IPNT capabilities, to existing CTI-enhanced call centers. Such improvements, as described herein and known to the inventor, include methods for guaranteeing available bandwidth or quality of service (QoS) for a transaction, improved mechanisms for organizing, coding, compressing, and carrying data more efficiently using less bandwidth, and methods and apparatus for intelligently replacing lost data by using voice supplementation methods and enhanced buffering capabilities.

In typical call centers, DNT is accomplished by Internet connection and IPNT calls. For this reason, IPNT and the Internet will be used almost exclusively in examples to follow. It should be understood, however, that this usage is exemplary, and not limiting.

In systems known to the inventors, incoming IPNT calls are processed and routed within an IPNT-capable call center in much the same way as COST calls are routed in a CTI-enhanced center, using similar or identical routing rules, waiting queues, and so on, aside from the fact that there are two separate networks involved. Call centers having both CTI and IPNT capability utilize LAN-connected agent-stations with each station having a telephony-switch-connected headset or phone, and a PC connected, in most cases via LAN, to the LAN over which IPNT calls may be routed. Therefore, in most cases, IPNT calls are-routed to the agent's PC while conventional telephony calls are routed to the agent's conventional telephone or headset. However, a method known to the inventor allows one headset to be used at an agent's station for handling both IPNT and COST calls. This is accomplished via connecting the agent's telephone to the sound card on the agent's PC/VDU with an I/O cable. In most prior art and current art systems, separate lines and equipment must be implemented for each type of call weather COST or IPNT.

Due in part to added costs associated with additional equipment, lines, and data ports that are needed to add IPNT capability to a CTI-enhanced call-center, companies are currently experimenting with various forms of integration between the older COST system and the newer IPNT system. For example, by enhancing data servers, interactive voice response units (IVR's), agent-connecting networks, and so on, with the capability of understanding Internet protocol, data arriving from either network may be integrated requiring less equipment and lines to facilitate processing, storage, and transfer of data. However, telephony trunks and IPNT network lines representing the separate networks involved still provide for significant costs and maintenance.

In some current art implementations, incoming data from the COST network and the Internet is caused to run side by side from the network level to a call center over a telephone connection (T1/E1) acting as a telephone-data bridge, wherein a certain channels are reserved for COST connection, and this portion is dedicated as is necessary in COST protocol (connection oriented), and the remainder is used for DNT such as IPNT calls, and for perhaps other data transmission. Such a service is generally offered by a local phone company. This service eliminates the requirement for leasing numerous telephony trunks and data-network connections. Routing and other equipment, however, must be implemented at both the call-center level and network level significantly reducing any- realized cost savings.

A significant disadvantage of such a bridge, having dedicated equipment on each end, is the dedicated nature of individual channels over the bridging link. Efficient use of bandwidth cannot be assured during variable traffic conditions that may prevail at certain times. For example, dedicated channels assigned to IPNT traffic would not be utilized if there were not enough traffic to facilitate their use. Similarly, if there was more COST traffic than the allotted number of COST channels could carry, no additional channels could be made available.

In a yet more advanced system, known in some call centers, a central switch within the call center is enhanced with IP conversion capability and can communicate via LAN to connected IP phone-sets and PC's eliminating the need for regular telephone wiring within a call center. However, the service is still delivered via a telephone-data bridge as described above. Therefore, additional requirements for equipment and inefficiency regarding use of bandwidth are still factors.

In still other systems known to the inventor and illustrated as prior art below, IPNT to COST conversion or COST to IPNT conversion is performed within the call center instead of via a network bridge. This is accomplished via a gateway connected to both an IPNT router and a central telephony-switching apparatus. In the first case, all calls are converted to and routed as COST calls over internal telephone wiring to switch-connected headsets. In the second case, all COST calls are converted to and routed as IPNT calls over a LAN to individual PC/VDU's.

In all of the described prior art systems, the concerted goal has been to integrate COST and IPNT data via converging at the network level or within the call center. The addition of dedicated hardware both at the network level and within the call center adds to the expense of providing such integrated data.

What is clearly needed is a routing system enabled to route both COST and IPNT calls to available agents sharing a LAN within a call center while maintaining separate delivery and outbound network architectures for the different media. A system such as this would unify all routed events and could be used with COST/IPNT capable headsets (known to the inventor) so an agent can handle both media with the same headset.

SUMMARY OF THE INVENTION

In a preferred embodiment of the present invention an integrated router (IR) is provided, comprising a first link adapted to connect the IR to a telephony switch capable of receiving and switching connection-oriented, switched telephony (COST) calls to connected telephones at agent stations; a second link adapted to connect the IR to a DNT processor capable of receiving and switching data network telephony (DNT) calls to network-connected DNT interface equipment at the agent stations; and control routines adapted for monitoring and controlling both the telephony switch and the DNT processor. The telephony switch and the DNT processor report incoming calls, whether COST or DNT, to the IR, and the IR controls the telephony switch and the DNT processor to route calls to available agent stations under a single set of rules. In some embodiments IR is connected by the first link to a telephony switch through a CTI processor. To gauge agent status the IR accesses a real-time data base storing agent status.

In another aspect of the invention a call center is provided, comprising a telephony switch capable of receiving and switching connection-oriented, switched telephony (COST) calls to connected telephones at agent stations; a DNT processor capable of receiving and switching data network telephony (DNT) calls to network-connected DNT interface equipment at the agent stations; and an integrated router adapted to monitor and control both the telephony switch and the DNT processor. In this aspect the telephony switch and the DNT processor report incoming calls, whether COST or DNT, to the IR, and the IR controls the telephony switch and the DNT processor to route calls to available agent stations under a single set of rules. In this embodiment the IR may be connected by the first link to a telephony switch through a CTI processor. Also, the IR accesses a real-time data base storing agent status. In addition, selected agent stations may have both a COST-capable telephone and a personal computer with a video display unit (PC/VDU), with the telephone connected to the PC/VDU through a sound card such that the telephone can be used for both COST and DNT calls. The telephone may be a headset telephone.

In still another aspect a method for commonly routing COST and DNT calls in a call center is provided, comprising steps of (a) informing an integrated router (IR) of connection-oriented, switched telephony (COST) calls received at a telephony switch connected to telephones at agent stations; (b) informing the IR of Data Network Telephony (DNT) calls received at a DNT-capable call center; (c) consulting an agent-availability data repository; and (d) routing the COST and DNT calls commonly to the agent stations based on agent availability. In this method, in step (c) the agent-availability repository is updated in real time, additional routing rules may be used beyond agent availability.

The system of the invention, in its various aspects as taught below in enabling detail, a low-cost and easily-implemented solution to the need for common routing of incoming COST and DNT calls is provided.

BRIEF DESCRIPTION OF THE DRAWING FIGURES

DESCRIPTION OF THE PREFERRED EMBODIMENTS

Figure 1:
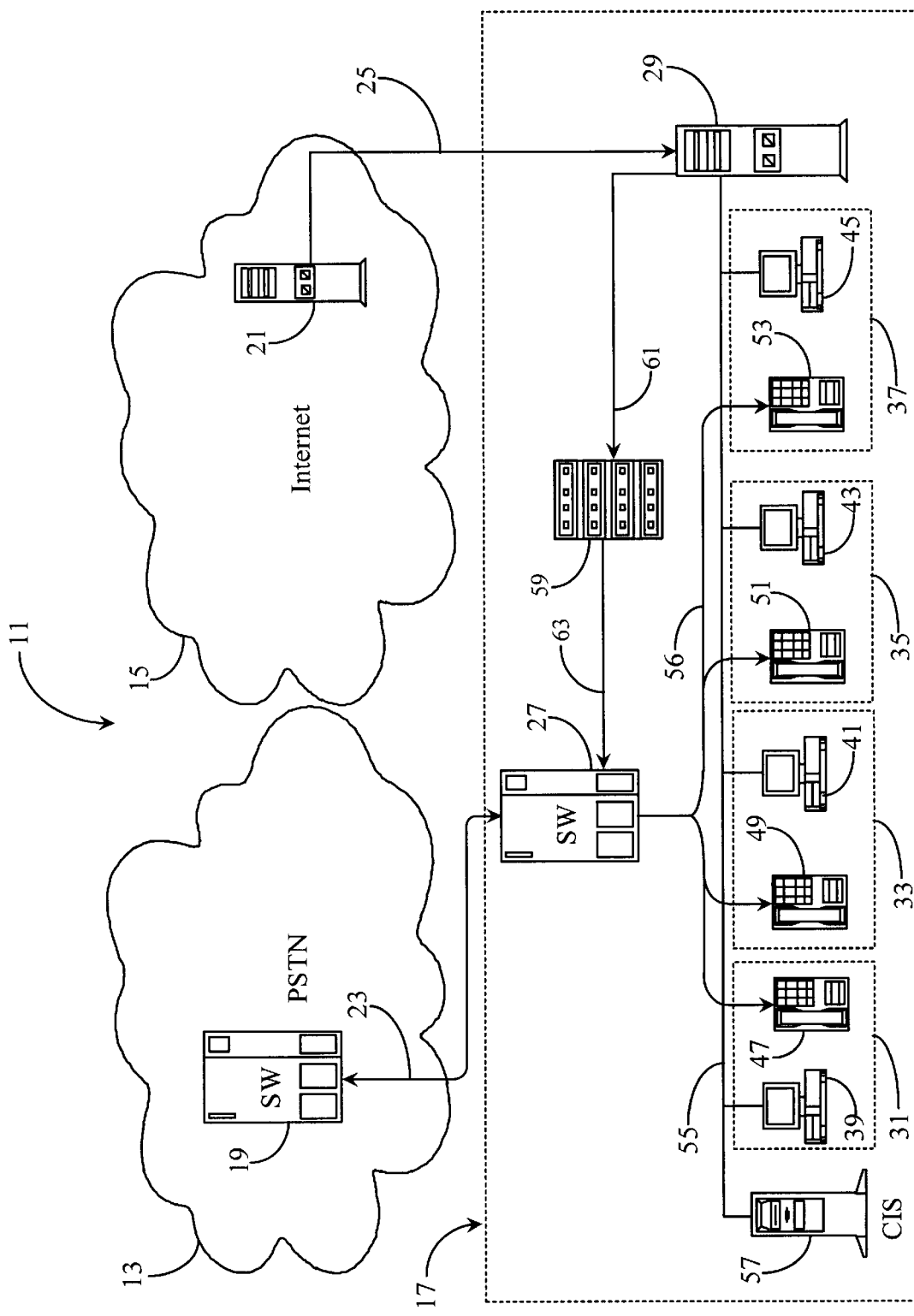
FIG. 1 is a system diagram of a call center connected to a telecommunication network using IPNT to COST conversion according to prior art.

FIG. 1 is a system diagram of a call center connected to a telecommunication network using IPNT to COST conversion according to prior art. As described briefly with regards to the background section, various prior art telecommunication networks utilize network-bridging techniques for the purpose of causing IPNT and COST incoming calls to run parallel into the call center. In current systems, as was also described, various implementations have been made within the call center for converting IPNT to COST, and conversely, COST to IPNT. FIG. 1 represents one such current art system.

In FIG. 1 telecommunications network 11 comprises a publicly-switched telephone network (PSTN) 13, the Internet network 15, and a call center 17. PSTN network 13 may be a private network rather than a public network, and Internet 15 may be another public or a private data network as are known in the art.

In this basic prior art example, call center 17 is equipped to handle both COST calls and IPNT calls. Both COST calls and IPNT calls are delivered to call-center 17 by separate network connections. For example, a telephony switch 19 in the PSTN may receive incoming telephone calls and rout them over a COST network trunk 23 to a central switching apparatus 27 located within call center 17. IPNT calls from Internet 15 are routed via a data router 21 over a data-network connection 25 to an IPNT router 29 within call center 17. In this example, network switch 19 is meant to represent a wide variety of processing and switching equipment in a PSTN, and router 21 is exemplary of many routers and IP switches in the Internet, as known in the art.

Call center 17 further comprises four agent stations 31, 33, 35, and 37. Each of these agent stations, such as agent station 31, for example, comprises an agent's telephone 47 adapted for COST telephone communication and an agent's PC/VDU 39 adapted for IPNT communication and additional data processing and viewing. Agent's telephones 47, 49, 51, and 53 along with agent's PC/VDU 39, 41, 43, and 45 are in similar arrangement in agent stations 31, 33, 35, and 37 respectively. Agent's telephones, such as agent's telephone 49, are connected to COST switching apparatus 27 via telephone wiring 56.

A LAN 55 connects agent's PC/VDU's to one another and to a CPE IPNT router 29. A client-information-system (CIS) server 57 is connected to LAN 55 and provides additional. stored information about callers to each LAN-connected agent. Router 29 routes incoming IPNT calls to agent's PC/VDU's that are also LAN connected as previously described. A data network connection 25 connects data router 29 (DNT Processor) to data router 21 located in Internet 15. Specific Internet access and connectivity is not shown, as such is well known in the art, and may be accomplished in any one of several ways. The salient feature to be emphasized in this prior art example is that separate connections and equipment are necessary and implemented to be able to handle both COST and IPNT calls at the call center.

Each agent's PC/VDU, such as PC/VDU 45 has a connection via LAN 55 and data network connection 25 to Internet 15 while the assigned agent is logged on to the system, however, this is not specifically required but rather preferred, so that incoming IPNT calls may be routed efficiently. Dial-up connecting rather than a continuous connection to Internet 15 may sometimes be employed.

An agent operating at an agent station such as agent station 33 may have COST calls arriving on agent's telephone 49 while IPNT calls are arriving on agent's PC/VDU 41. In examples prior to this example, router 29 would not have a connection to central switching apparatus 27. Having no such connection creates a cumbersome situation, requiring agents to distribute their time as best they can between the two types of calls. Thus, agent time is not utilized to maximum efficiency with respect to the total incoming calls possible from both networks.

In this embodiment however, router 29 is connected to an IPNT-to-COST gateway 59 via data connection 61. Gateway 59 is connected to central switch 27 via CTI connection 63. Gateway 59 is adapted to convert all incoming and outgoing IPNT calls to COST calls where they may be routed over wiring 56 to agents (incoming), or over trunk 23 to switch 19 in cloud 13 (outgoing). In this way, agents may use switch-connected. telephones, such as telephone 47 to answer both IPNT-to-COST converts and regular incoming COST calls. The agent's time is better utilized, and additional network equipment comprising a network bridge,and associated network connections are not required.

This prior art example, however, presents some problems and limitations. One problem is that traditional COST equipment such as routers, switches, and wiring may have to be significantly expanded to handle more traffic regarding the added call-load received from cloud 15. Further, the ability to predict possible call overload situations is significantly complicated because of the convergence of IPNT calls into the COST routing system. As IPNT calls are now received by agents as COST calls, certain features inherent to IPNT applications will be lost such as multimedia enhancements, and the like.

One advantage with this example is that calls originating as IPNT calls within call center 17 may be sent as IPNT calls over data connection 25, or as converted COST calls over trunk 23. Another advantage is that LAN 55 is free to carry data other than IPNT audio packets.

Figure 2:
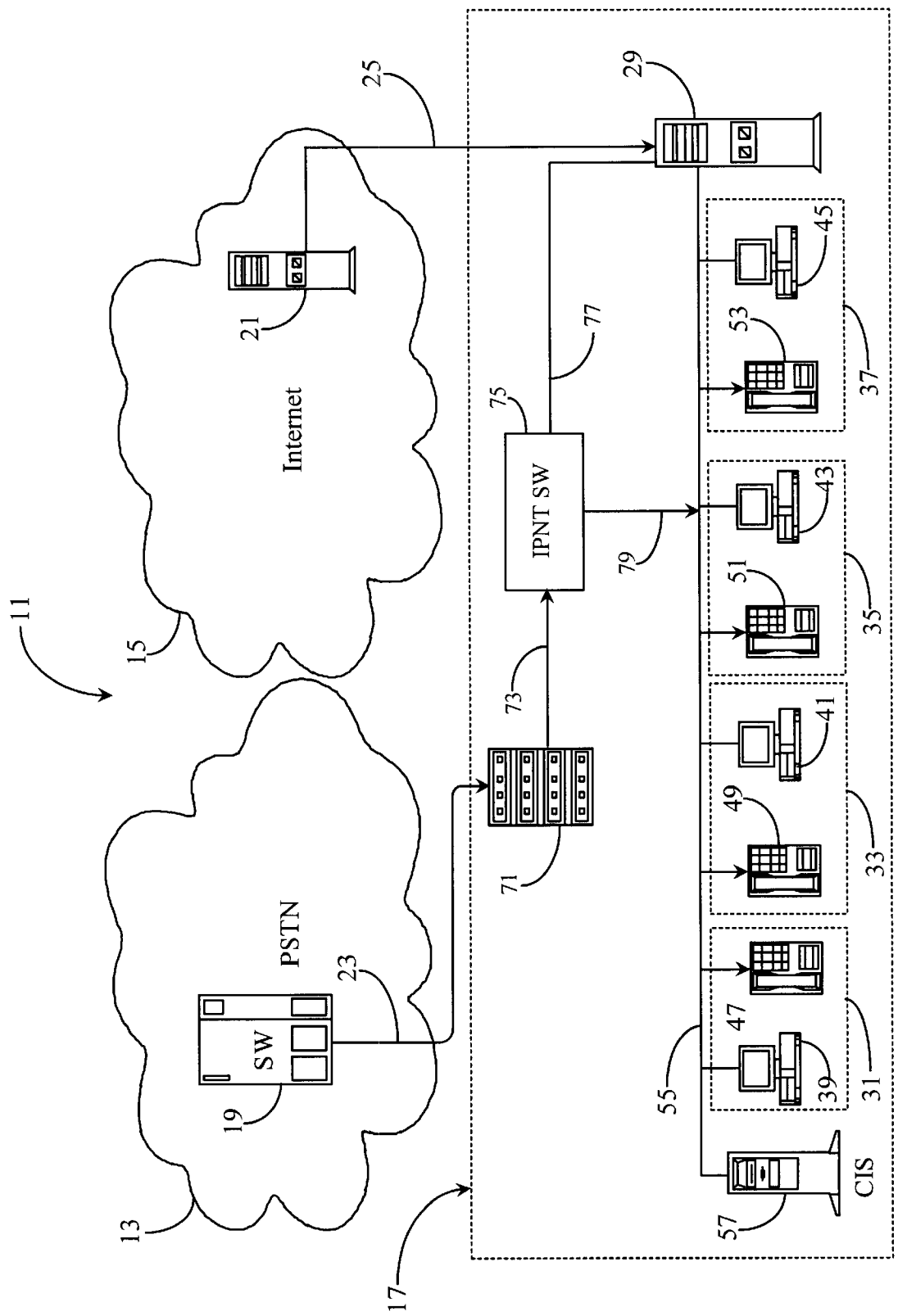
FIG. 2 is a system diagram of the call center and telecommunication network of FIG. 1 using IPNT switching at the call center according to prior art.

FIG. 2 is a system diagram of the call center and telecommunication network of FIG. 1 using IPNT switching at the call center according to prior art. This prior art example is essentially reversed from the prior art example described in FIG. 1. For the sake of saving space and avoiding redundancy, elements found in this example that are identical to the example of FIG. 1 will not be re-introduced.

Call center 17 receives COST calls from cloud 13 over trunk 23, and IPNT calls from cloud 15 over data connection 25 as described with the prior art example of FIG. 1. However, instead of having a central telephony-switch such as switch 27 of FIG. 1, a COST-to-IPNT gateway 71 is provided and adapted to convert COST calls to IPNT calls.

After converting incoming COST calls to IPNT calls, these are routed via data connection 73 to an IPNT switch 75. IPNT switch 75 is adapted to distribute the resulting IPNT calls to selected agent's over LAN 55. Regular IPNT calls are routed to LAN-connected agents via router 29.

Agent's telephones 47–53 are, in this example, adapted as IP phones and are each connected to LAN 55. Internal wiring and other COST related architecture is not required, which is one distinct advantage of this prior art system.

A disadvantage of this system is that there is no provision to make outbound calls to the PSTN 13. Only further enhancement to gateway 71 to convert IPNT calls to COST calls enables out-bound dialing to PSTN 13 from within call center 17. Under heavy call-load situations, a dual gateway such as would be the case with gateway 71 may become congested and cause delay. Additional apparatus may be required to alleviate this problem. In some cases wherein there are concerted outbound campaigns taking place on a frequent basis, it may be more prudent to maintain a COST switch and internal wiring within call center 17 connected to either agent telephones (maintaining dual capability) or, to add a second set of telephones dedicated for outbound campaigns. Moreover, agents are reintroduced with a problem solved in the example of FIG. 1 of having to deal with incoming calls to both IP phones, and PC/VDU's.

Figure 3:
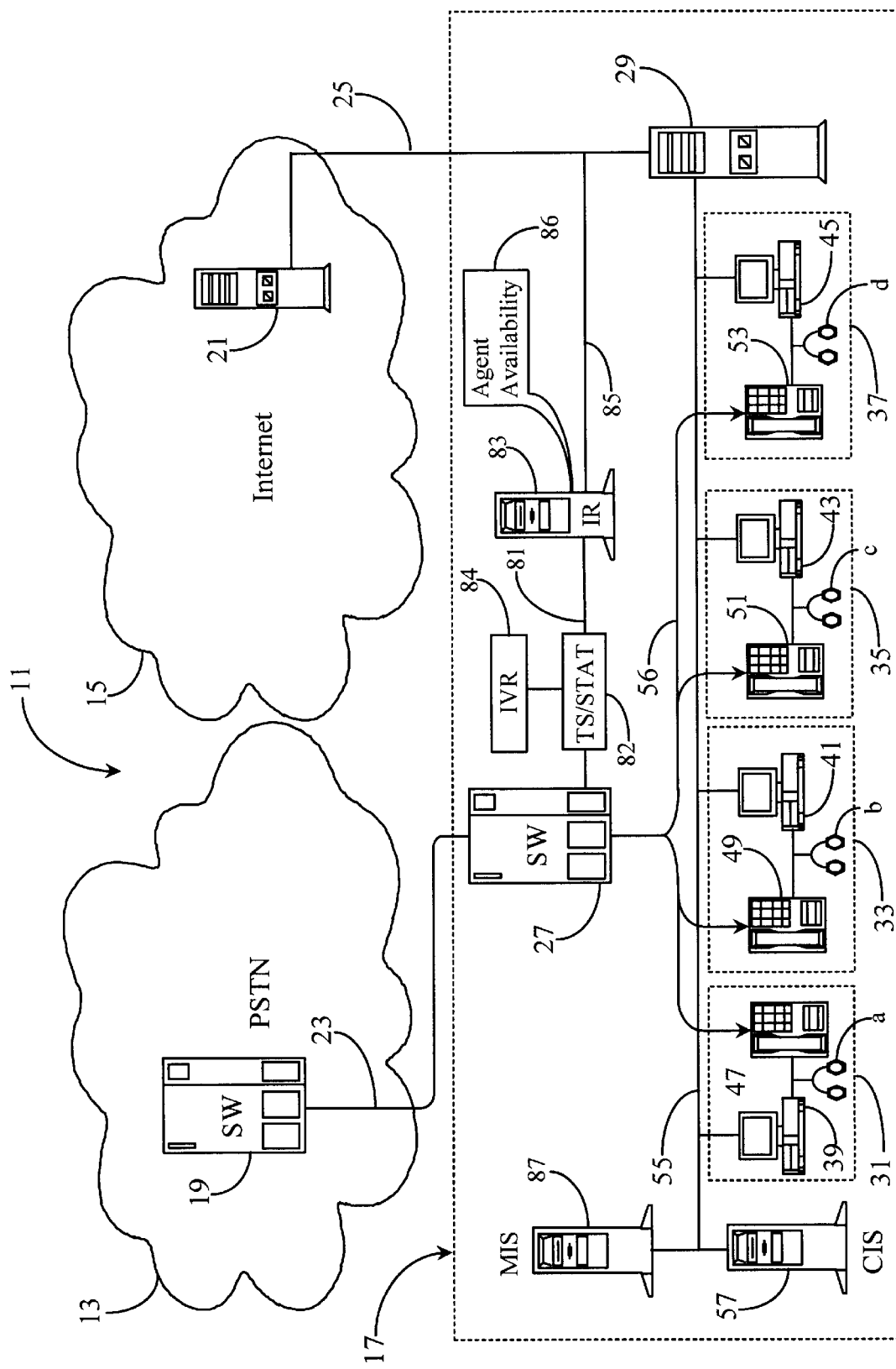
FIG. 3 is a system diagram of the call center and telecommunication network of FIG. 1 enhanced with integrated routing according to an embodiment of the present invention.

FIG. 3 is a system diagram of the call center and telecommunication network of FIG. 1 enhanced with integrated routing according to an embodiment of the present invention. As discussed with reference to FIG. 2, common elements introduced with the prior art example of FIG. 1 will not be reintroduced here unless they are altered according to an embodiment of the present invention.

According to a preferred embodiment of the present invention, call center 17 receives COST and IPNT calls from their respective separate networks comprising telecommunication system 11. Call center 17 is, in this example, enhanced with an integrated router (IR) 83 capable of routing both COST calls and IPNT calls. Central switch 27 is connected via CTI link to a processor 82 running instances of a CTI application known to the inventors as T-server and Stat-server (TS/STAT). An intelligent peripheral in the form of an IVR 84 is connected to processor 82 via data link 81. Processors 82 and IVR 84 provide CTI enhancement to switch 27, as well as an application programming interface (API) to IR 83 via installed software.

It will be apparent to the skilled artisan that processor 82, IVR 84 and IR 83 may be implemented in a single computing machine executing all of the necessary software, but the functions have separated here for clarity in description.

A multimedia data server (MIS) 87 is connected to LAN 55, and is adapted to store and serve certain multimedia content as known in the art. Switch 27 and Router 29 are maintained as call-arrival points for calls arriving from either PSTN 13 or Internet 15 adhering to the separate network-architecture previously described.

IR 83 performs in an innovative manner in that it not only controls central switch 27 through interaction with processor 82, and therefore routing of COST calls, but also controls DNT processor 29 and the routing of IPNT calls. IR 83 controls routing of both COST and IPNT calls whether such calls are incoming or outgoing.

An agent status-table 86 is a real-time database containing agent availability information, which is continually updated as operation of the call center proceeds. Table 86 may reside in IR 83 as shown, or may reside on processor 82 as part of the T-Server software. Table 86 keeps track of when agents log on or off to the system, and which agents are busy on calls (either COST or IPNT). It will be appreciated that any combination of rules set by the company hosting center 17 may be in place such as priority routing, routing based on skill, statistical routing, and so on, in various combinations known to the inventors.

Integrated routing as provided by IR 83 allows calls of both types (COST/IPNT) to be distributed evenly among available agents without adding expensive call conversion equipment, or effecting outbound dialing capabilities.

Yet another improvement in this example over prior art systems is known to the inventor and implemented at some or all agent stations such as stations 31–37. As briefly described with reference to the background section, agent stations 31–37 have PC-connected telephones. An I/O cable completes this interface via connection from a telephone receiver/transceiver apparatus such as on telephone 53 to a sound card installed on an associated PC such as PC/VDU 45. Individual one's of headsets such as headsets a-d are connected either to each telephone or each PC/VDU and are adapted to allow an agent to engage both COST and IPNT calls using the same headset.

It will be apparent to one with skill in the art that the integrated routing system of the present invention may be utilized in any call center capable of receiving both COST and IPNT (or other DNT) communication. It will also be apparent to one with skill in the art that the present invention may implemented as part of a CTI software package, or held separately and integrated with such a CTI implementation. The present invention is limited only by the claims that follow.

What is claimed is:

1. An integrated router (IR) comprising:
   a first link connecting the IR to a telephony switch for receiving and switching connection-oriented, switched telephony (COST) calls to connected telephones at agent stations;
   a second direct link coupling the IR to a DNT processor capable of receiving and switching data network telephony (DNT) calls to network-connected DNT interface equipment at the agent stations;

an agent-status data repository for storing status and availability information of the agent stations; and control routines directly monitoring and controlling both the telephony switch and the DNT processor, via the first and second links;

wherein the telephony switch and the DNT processor directly report incoming calls, whether COST or DNT, to the IR, and the IR directly controls the telephony switch and the DNT processor to route calls to available agent stations under a single set of routing rules at least partially based on agent status and availability information received from the agent-status data repository.

2. The IR of claim 1 wherein the IR is connected by the first link to a telephony switch through a CTI processor.

3. A call center comprising:

a telephony switch receiving and switching connection-oriented, switched telephony (COST) calls to connected telephones at agent stations;

a DNT processor receiving and switching data network telephony (DNT) calls to network-connected DNT interface equipment at the agent stations;

an agent-status data repository for storing status and availability information of the agent stations; and an integrated router (IR) adapted to directly monitor and control both the telephony switch and the DNT processor;

wherein the telephony switch and the DNT processor directly report incoming calls, whether COST or DNT, to the IR, and the IR directly controls the telephony switch and the DNT processor to route the calls to available agent stations under a single set of rules at least partially based on agent status and availability information received from the agent-status data repository.

4. The call center of claim 3 wherein the IR is connected by the first link to a telephony switch through a CTI processor.

5. The call center of claim 3 wherein selected agent stations have both a COST-capable telephone and a personal computer with a video display unit (PC/VDU), and the telephone is connected to the PC/VDU through a sound card such that the telephone can be used for both COST and DNT calls.

6. The call center of claim 5 wherein the telephone is a headset telephone.

7. A method for commonly routing COST and DNT calls in a call center, comprising steps of:

(a) directly informing an integrated router (IR) of connection-oriented, switched telephony (COST) calls received at a telephony switch connected to telephones at agent stations;

(b) directly informing the IR of Data Network Telephony (DNT) calls received at a DNT-capable processor switching DNT calls;

(c) consulting an agent-availability data repository; and (d) routing the COST and DNT calls under a single set of routing rules to the agent stations at least partially based on agent availability information received from the agent-availability data repository.

8. The method of claim 7 wherein in step (c) the agent-availability repository is updated in real time.

* * * * *